United States Patent
Rzeszutek

(10) Patent No.: US 10,572,763 B2
(45) Date of Patent: Feb. 25, 2020

(54) METHOD AND APPARATUS FOR SUPPORT SURFACE EDGE DETECTION

(71) Applicant: SYMBOL TECHNOLOGIES, LLC, Lincolnshire, IL (US)

(72) Inventor: Richard Jeffrey Rzeszutek, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/698,361

(22) Filed: Sep. 7, 2017

(65) Prior Publication Data

US 2019/0073554 A1    Mar. 7, 2019

(51) Int. Cl.
*G06K 9/00* (2006.01)
*G06K 9/46* (2006.01)
(Continued)

(52) U.S. Cl.
CPC ............ *G06K 9/4604* (2013.01); *G01S 17/06* (2013.01); *G01S 17/89* (2013.01);
(Continued)

(58) Field of Classification Search
CPC ............ G06K 9/4604; G06K 7/10792; G06K 9/00664; G06K 9/3241; G01S 17/023; G01S 17/026; G01S 17/89
See application file for complete search history.

(56) References Cited

U.S. PATENT DOCUMENTS

| | | |
|---|---|---|
| 5,214,615 A | 5/1993 | Bauer |
| 5,408,322 A | 4/1995 | Hsu et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

Richard O. Duda, et al., "Use of the Hough Transformation to Detect Lines and Curves in Pictures", Stanford Research Institute, Menlo Park, California, Graphics and Image Processing. Communications of the ACM, Jan. 1972, vol. 15, No. 1.

(Continued)

*Primary Examiner* — Ping Y Hsieh

(57) ABSTRACT

A method of detecting an edge of a support surface by an imaging controller includes: obtaining a plurality of depth measurements captured by a depth sensor and corresponding to an area containing the support surface; selecting, by the imaging controller, a candidate set of the depth measurements based on at least one of (i) an expected proximity of the edge of the support surface to the depth sensor, and (ii) an expected orientation of the edge of the support surface relative to the depth sensor; fitting, by the imaging controller, a guide element to the candidate set of depth measurements; and detecting, by the imaging controller, an output set of the depth measurements corresponding to the edge from the candidate set of depth measurements according to a proximity between each candidate depth measurement and the guide element.

22 Claims, 12 Drawing Sheets

(51) Int. Cl.
    *G01S 17/06*     (2006.01)
    *G01S 17/89*     (2020.01)
    *G06K 7/10*     (2006.01)
    *G06K 9/32*     (2006.01)
    *G01S 17/02*     (2020.01)

(52) U.S. Cl.
    CPC ..... *G06K 7/10792* (2013.01); *G06K 9/00664* (2013.01); *G06K 9/3241* (2013.01); *G01S 17/023* (2013.01)

(56) References Cited

U.S. PATENT DOCUMENTS

| | | |
|---|---|---|
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 * | 1/2014 | Groenevelt ......... G06Q 10/087 211/90.01 |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,639,935 B1 | 5/2017 | Douady-Pleven et al. |
| 9,697,429 B2 | 7/2017 | Patel et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,928,708 B2 | 3/2018 | Lin et al. |
| 10,019,803 B2 | 7/2018 | Venable et al. |
| 10,127,438 B1 | 11/2018 | Fisher et al. |
| 10,229,386 B2 | 3/2019 | Thomas |
| 10,265,871 B2 | 4/2019 | Hance et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0174891 A1 | 9/2003 | Wenzel et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2007/0074410 A1 | 4/2007 | Armstrong et al. |
| 2007/0272732 A1 | 11/2007 | Hindmon |
| 2008/0025565 A1 | 1/2008 | Zhang et al. |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |

(56) References Cited

U.S. PATENT DOCUMENTS

| | | |
|---|---|---|
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0075342 A1 | 3/2012 | Choubassi et al. |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1* | 5/2013 | Lu .................. G07F 9/026 221/1 |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalakrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1* | 12/2014 | Patel ............... G06F 17/30247 382/201 |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1* | 3/2015 | Yan .................. G06F 3/147 705/28 |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0262116 A1* | 9/2015 | Katircioglu ......... G06Q 10/087 705/28 |
| 2015/0298317 A1 | 10/2015 | Wang et al. |
| 2015/0352721 A1* | 12/2015 | Wicks ................. B25J 9/1664 700/228 |
| 2015/0363625 A1* | 12/2015 | Wu .................. G06K 7/146 382/203 |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171707 A1 | 6/2016 | Schwartz |
| 2016/0191759 A1 | 6/2016 | Somanath et al. |
| 2016/0253735 A1 | 9/2016 | Scudillo et al. |
| 2016/0328618 A1 | 11/2016 | Patel et al. |
| 2016/0353099 A1 | 12/2016 | Thomson et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |

(56) References Cited

U.S. PATENT DOCUMENTS

| | | |
|---|---|---|
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1* | 4/2018 | Howell .............. G06Q 10/087 |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Sawides et al. |
| 2019/0065861 A1 | 2/2019 | Sawides et al. |
| 2019/0180150 A1 | 6/2019 | Taylor et al. |

FOREIGN PATENT DOCUMENTS

| | | |
|---|---|---|
| CN | 104200086 | 12/2014 |
| CN | 107067382 A | 8/2017 |
| EP | 766098 | 4/1997 |
| EP | 1311993 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | 2003002935 | 1/2003 |
| WO | 2003025805 | 3/2003 |
| WO | 2006136958 | 12/2006 |
| WO | 2007042251 | 4/2007 |
| WO | 2008057504 | 5/2008 |
| WO | 2008154611 | 12/2008 |
| WO | 2012103199 | 8/2012 |
| WO | 2012103202 | 8/2012 |
| WO | 2012154801 | 11/2012 |
| WO | 2013165674 | 11/2013 |
| WO | 2014066422 | 5/2014 |
| WO | 2014092552 | 6/2014 |
| WO | 2014181323 A1 | 11/2014 |
| WO | 2015127503 | 9/2015 |
| WO | 2016020038 | 2/2016 |
| WO | 2018018007 | 1/2018 |
| WO | 2019023249 | 1/2019 |

OTHER PUBLICATIONS

N. Senthilkumaran, et al., "Edge Detection Techniques for Image Segmentation—A Survey of Soft Computing Approaches", International Journal of Recent Trends in Engineering, vol. 1, No. 2, May 2009.
Combined Search and Examination Report dated Mar. 11, 2015 in UK patent application GB1417218.3.
United Kingdom Intellectual Property Office, "Combined Search and Examination Report," dated Jan. 22, 2016 in connection with GB Patent Application No. 1521272.3.
United Kingdom Intellectual Property Office, "Examination Report," dated Jan. 22, 2016 in connection with GB Patent Application No. GB1417218.3.
Rzeszutek, U.S. Appl. No. 15/698,340, filed Sep. 7, 2017.
Szeliski, "Modified Hough Transform", Computer Vision. Copyright 2011. pp. 251-254. Retrieved on Aug. 17, 2017. [http://szeliski.org/Book/drafts/SzeliskiBook_20100903_draft.pdf].
United Kingdom Intellectual Property Office, "Combined Search and Examination Report" for GB Patent Application No. 1813580.6 dated Feb. 21, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2013/053212 dated Dec. 1, 2014.
International Search Report and Written Opinion from International Patent Application No. PCT/US2013/070996 dated Apr. 2, 2014.
Jadhav et al. "Survey on Spatial Domain dynamic template matching technique for scanning linear barcode," International Journal of scieve and research v 5 n. 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vot. 22, No. 7-8, pp. 583-601 (Jul. 30, 2013).
Lari, Z., et al., "An adaptive approach for segmentation of 3D laser point cloud." International Archives of the Photogrammetry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norrlof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.

(56) References Cited

OTHER PUBLICATIONS

Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Tenology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerxist.psu.edu/viewdoc/download?doi=10.1.1.703.5365&rep=rep1&type=pdf, pp. 1-6.
Tseng, et al., "A Cloud Removal Approach for Aerial Image Visualization", International Journal of Innovative Computing, Information & Control, vol. 9, No. 6, pp. 2421-2440 (Jun. 2013).
Uchiyarna, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
International Search Report and Written Opinion for International Application No. PCT/US2019/025859 dated Jul. 3, 2019.
International Search Report and Written Opinion for corresponding International Patent Application No. PCT/US2017/024847 dated Jul. 7, 2017.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.

(56) References Cited

OTHER PUBLICATIONS

Hackel et al., "Contour Detection in unstructured 3D point clouds," IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for corresponding International Patent Application No. PCT/US2016/064110 dated Mar. 20, 2017.

* cited by examiner

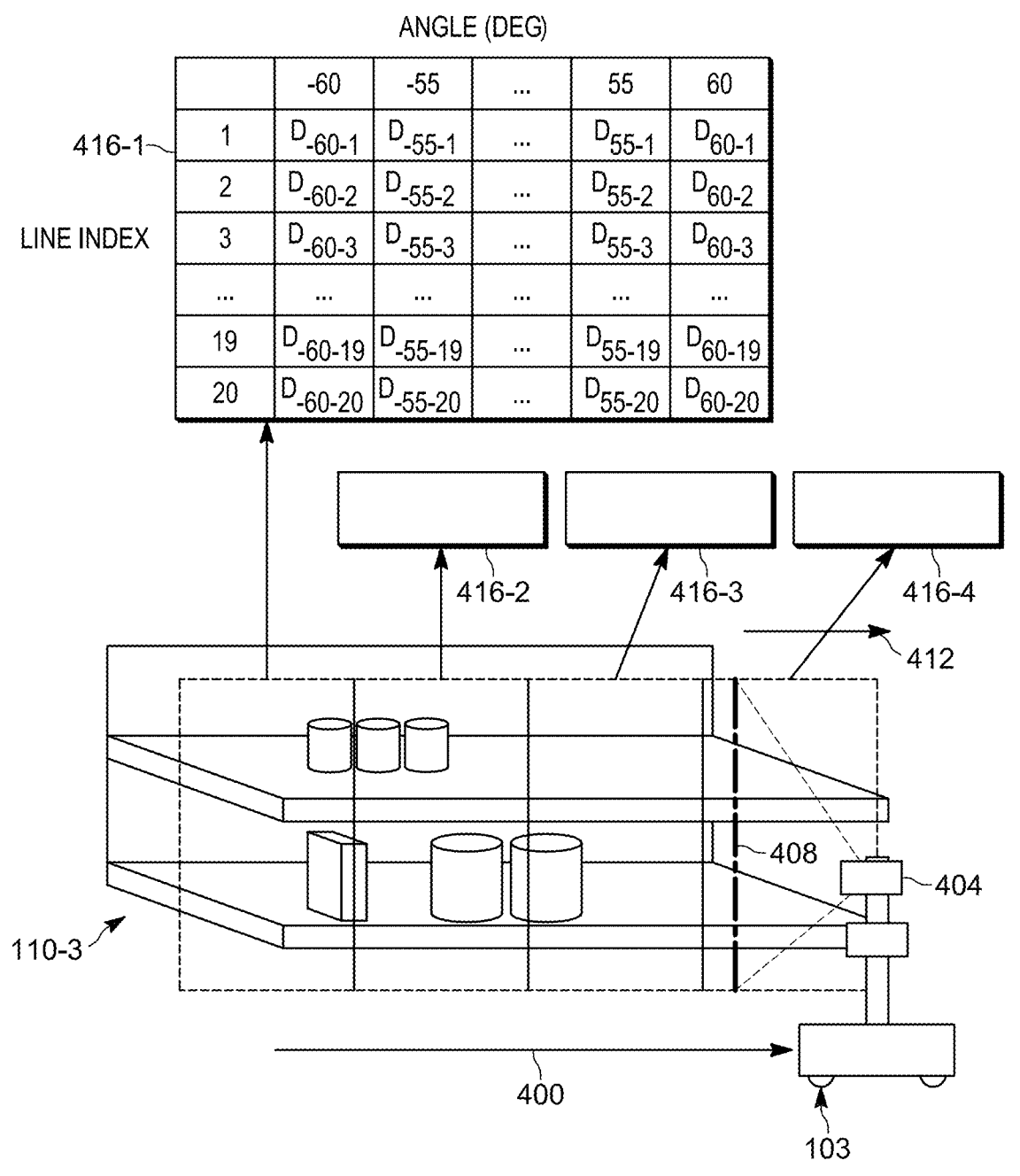

| | ANGLE (DEG) | | | | |
|---|---|---|---|---|---|
| | -60 | -55 | ... | 55 | 60 |
| 1 | $D_{-60-1}$ | $D_{-55-1}$ | ... | $D_{55-1}$ | $D_{60-1}$ |
| 2 | $D_{-60-2}$ | $D_{-55-2}$ | ... | $D_{55-2}$ | $D_{60-2}$ |
| 3 | $D_{-60-3}$ | $D_{-55-3}$ | ... | $D_{55-3}$ | $D_{60-3}$ |
| ... | ... | ... | ... | ... | ... |
| 19 | $D_{-60-19}$ | $D_{-55-19}$ | ... | $D_{55-19}$ | $D_{60-19}$ |
| 20 | $D_{-60-20}$ | $D_{-55-20}$ | ... | $D_{55-20}$ | $D_{60-20}$ |

FIG. 4

METHOD AND APPARATUS FOR SUPPORT SURFACE EDGE DETECTION

BACKGROUND

Environments in which inventories of objects are managed, such as products for purchase in a retail environment, may be complex and fluid. For example, a given environment may contain a wide variety of objects with different sizes, shapes, and other attributes. Such objects may be supported on shelves in a variety of positions and orientations. The variable position and orientation of the objects, as well as variations in lighting and the placement of labels and other indicia on the objects and the shelves, can render detection of structural features such as the edges of the shelves difficult.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 depicts the capture of data employed in the method of FIG. 3 according to a first sensing technology.

Figure 1:
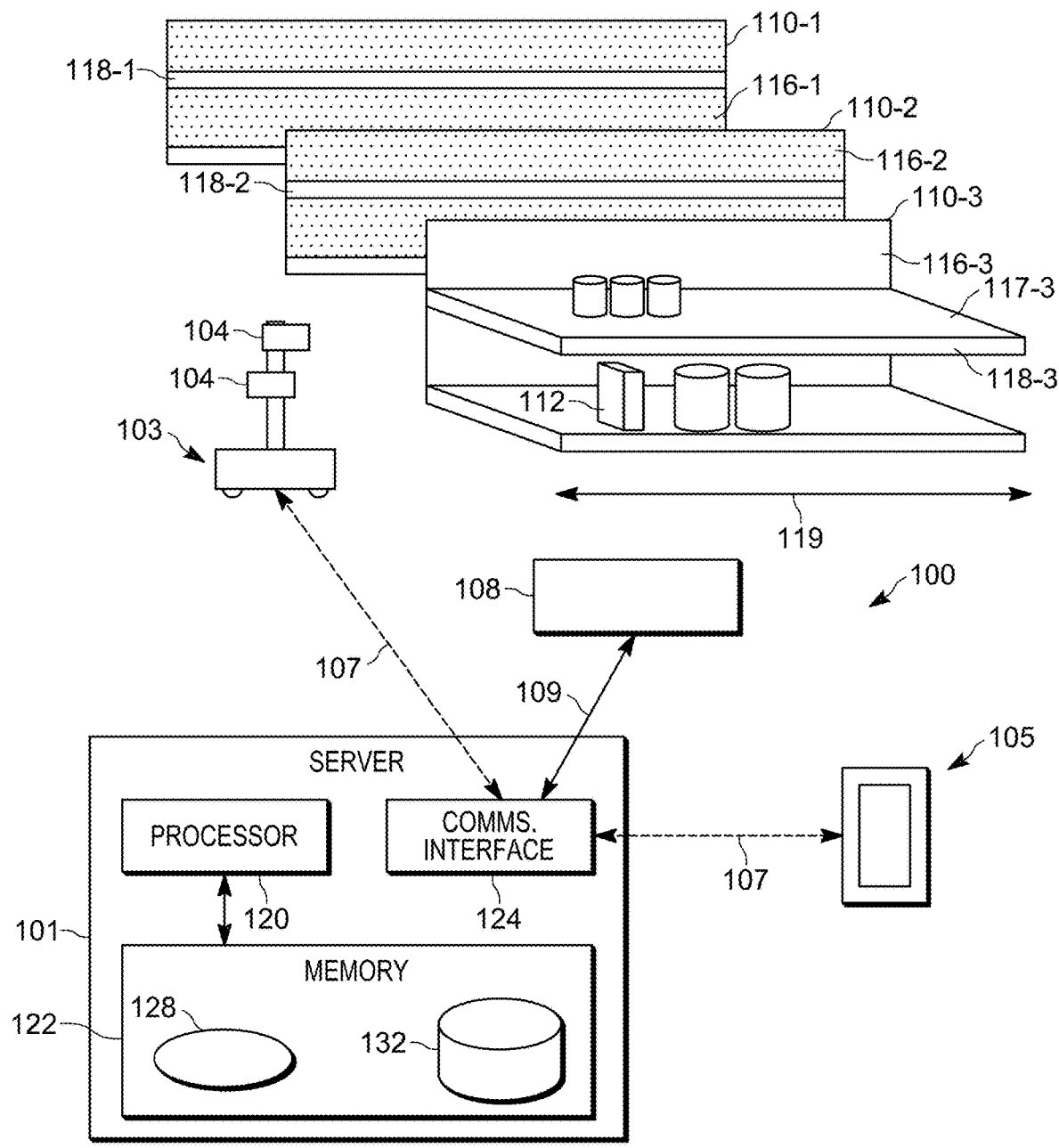
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In retail environments in which a plurality of products is supported on shelves, systems may be configured to capture images of the shelves and determine, from the images, various information concerning the products. For example, price labels may be located and decoded within the image, for use in ensuring that products are labelled with the correct prices. Further, gaps between products on the shelves may be identified as potentially indicating that one or more products are out of stock and require replenishment. The above determinations may require the identification of distances between the capture device and the shelf edges to describe the three-dimensional structure of the shelf edges, for use as reference structures for the identification of labels, products, gaps, and the like.

The identification of shelf edges from depth measurements is complicated by a variety of factors, including the proximity to the shelf edges of products having a wide variety of shapes and orientations. Such factors also include lighting variations, reflections, obstructions from products or other objects, and the like.

Examples disclosed herein are directed to a method of detecting an edge of a support surface by an imaging controller. The method includes: obtaining a plurality of depth measurements captured by a depth sensor and corresponding to an area containing the support surface; selecting, by the imaging controller, a candidate set of the depth measurements based on at least one of (i) an expected proximity of the edge of the support surface to the depth sensor, and (ii) an expected orientation of the edge of the support surface relative to the depth sensor; fitting, by the imaging controller, a guide element to the candidate set of depth measurements; and detecting, by the imaging controller, an output set of the depth measurements corresponding to the edge from the candidate set of depth measurements according to a proximity between each candidate depth measurement and the guide element.

Further examples disclosed herein are directed a to computing device for detecting an edge of a support surface, comprising: a memory; and an imaging controller including: a preprocessor configured to obtain a plurality of depth measurements captured by a depth sensor and corresponding to an area containing the support surface; a selector configured to select a candidate set of the depth measurements based on at least one of (i) an expected proximity of the edge of the support surface to the depth sensor, and (ii) an expected orientation of the edge of the support surface relative to the depth sensor; a guide generator configured to fit a guide element to the candidate set of depth measurements; and an output detector configured to detect an output set of the depth measurements corresponding to the edge from the candidate set of depth measurements according to a proximity between each candidate depth measurement and the guide element.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server 101, the client device 105, or both, are located outside the retail environment, and the links 107 therefore include wide-area networks such as the Internet, mobile networks, and the like. As will be described in greater detail below, the system 100 also includes a dock 108 for the apparatus 103. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 are typically arranged in a plurality of aisles, each of which includes a plurality of modules aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

More specifically, the apparatus 103 is deployed within the retail environment, and communicates with the server 101 (via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light), and is further configured to employ the sensors to capture shelf data. In the present example, the apparatus 103 is configured to capture a plurality of depth measurements corresponding to the shelves 110, each measurement defining a distance from the depth sensor to a point on the shelf 110 (e.g., a product 112 disposed on the shelf 110 or a structural component of the shelf 110, such as a shelf edge 118 or a shelf back 116).

The server 101 includes a special purpose imaging controller, such as a processor 120, specifically designed to control the mobile automation apparatus 103 to capture data (e.g. the above-mentioned depth measurements), obtain the captured data via a communications interface 124 and store the captured data in a repository 132 in a memory 122. The server 101 is further configured to perform various post-processing operations on the captured data and to detect certain structural features—such as the shelf edges 118—within the captured data. The post-processing of captured data by the server 101 will be discussed below in greater detail. The server 101 may also be configured to determine product status data based in part on the above-mentioned shelf edge detections, and to transmit status notifications (e.g. notifications indicating that products are out-of-stock, low stock or misplaced) to the mobile device 105 responsive to the determination of product status data.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the shelf edge detection discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103. The client device 105 also includes one or more controllers or processors and/or FPGAs, in communication with the controller 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

Figures 2A, 2B:
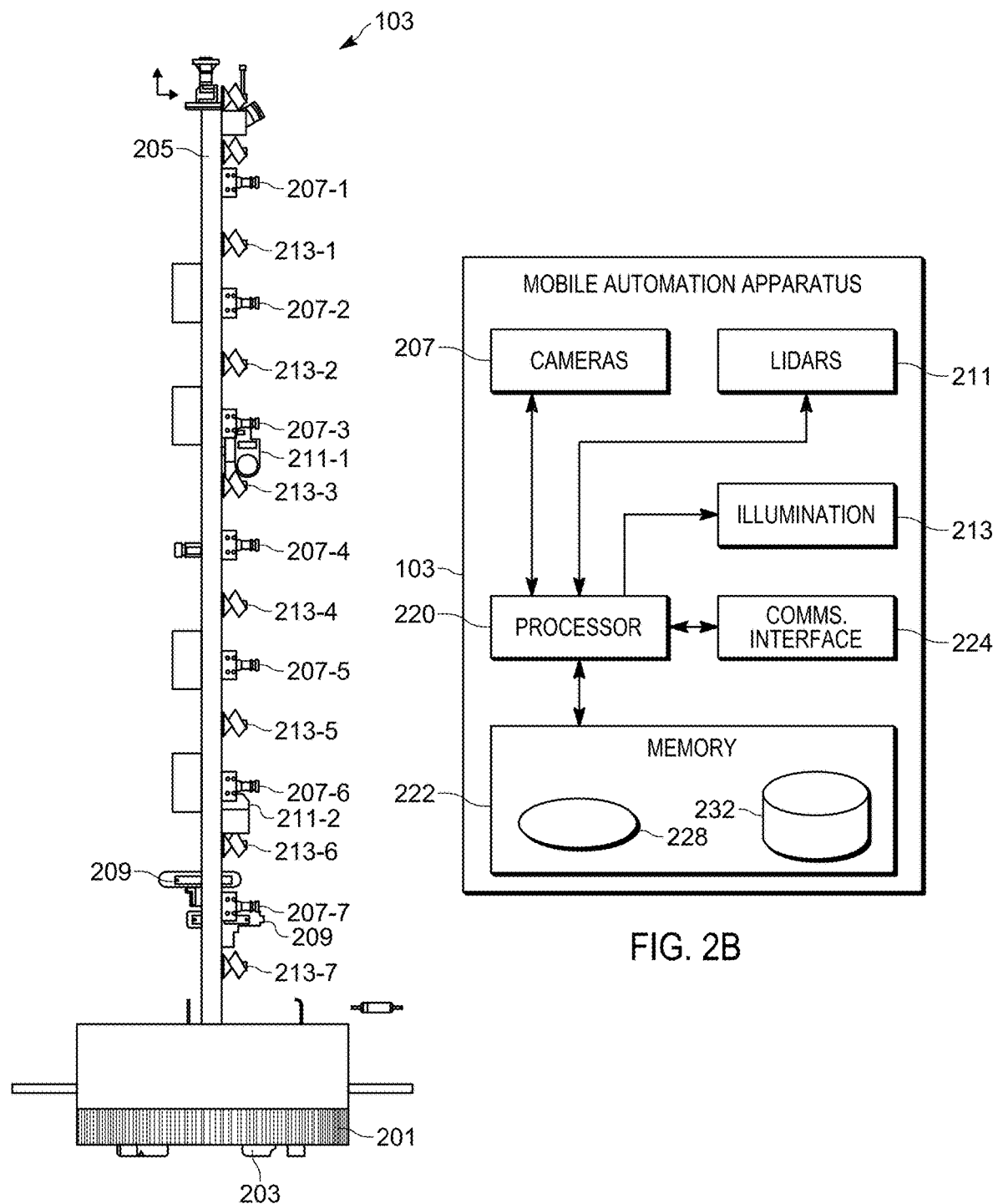
FIG. 2A depicts a mobile automation apparatus in the system of FIG. 1.
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth-sensing sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

To that end, the mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 203) and to the detection of shelf edges in data captured by the sensors (e.g. the depth cameras 209 or the lidar sensors 211). The application 228 may also be implemented as a suite of distinct applications in other examples.

The processor 220, when so configured by the execution of the application 228, may also be referred to as a controller 220 or, in the context of shelf edge detection from captured data, as an imaging controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

In the present example, as discussed below, one or both of the server 101 (as configured via the execution of the control application 128 by the processor 120) and the mobile automation apparatus 103 (as configured via the execution of the application 228 by the processor 220), are configured to process depth measurements captured by the apparatus 103 to identify portions of the captured data depicting the shelf edges 118. In further examples, the data processing discussed below may be performed on a computing device other than the server 101 and the mobile automation apparatus 103, such as the client device 105. The data processing mentioned above will be described in greater detail in connection with its performance at the server 101, via execution of the application 128.

Figure 2C:
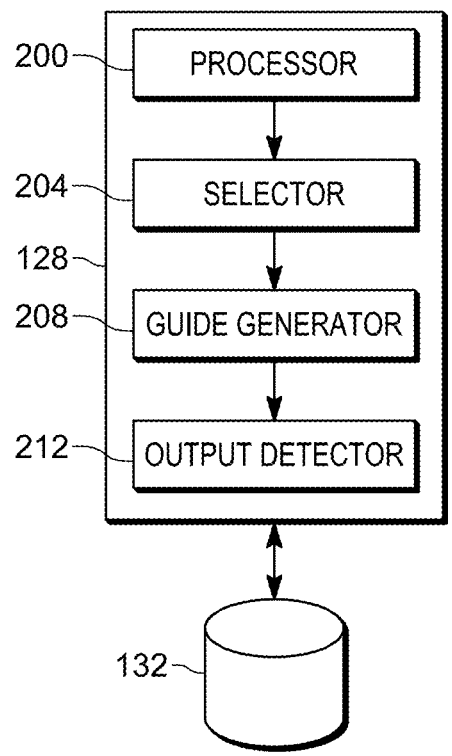
FIG. 2C is a block diagram of certain internal hardware components of the server in the system of FIG. 1.

Turning now to FIG. 2C, before describing the operation of the application 128 to identify the shelf edges 118 from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2C may also be implemented as dedicated hardware components, such as one or more ASICs or FPGAs. For example, in one embodiment, to improve reliability and processing speed, at least some of the components of FIG. 2C are programmed directly into the imaging controller 120, which may be an FPGA or an ASIC having circuit and memory configuration specifically designed to optimize image processing of a high volume of sensor data received from the mobile automation apparatus 103. In such an embodiment, some or all of the control application 128, discussed below, is an FPGA or an ASIC chip.

The control application 128 includes a preprocessor 200 configured to obtain depth measurements corresponding to the shelves 110 and the products 112 supported thereon, and to preprocess the depth measurements, for example by filtering the depth measurements prior to downstream processing operations. The control application 128 also includes a selector 204 configured to select a candidate set of depth measurements from the preprocessed depth measurements (i.e., the output of the preprocessor 200). As will be discussed below, the candidate set of depth measurements are depth measurements considered likely to correspond to shelf edges 118. The control application 128 also includes a guide generator 208 configured to generate a guide element (such as a curve or a plane) against which the above-mentioned candidate set of depth measurements is evaluated by an output detector 212 to detect an output set among the candidate set of depth measurements. The output set of depth measurements contains the depth measurements considered to have the greatest likelihood of corresponding to shelf edges 118.

Figure 3:
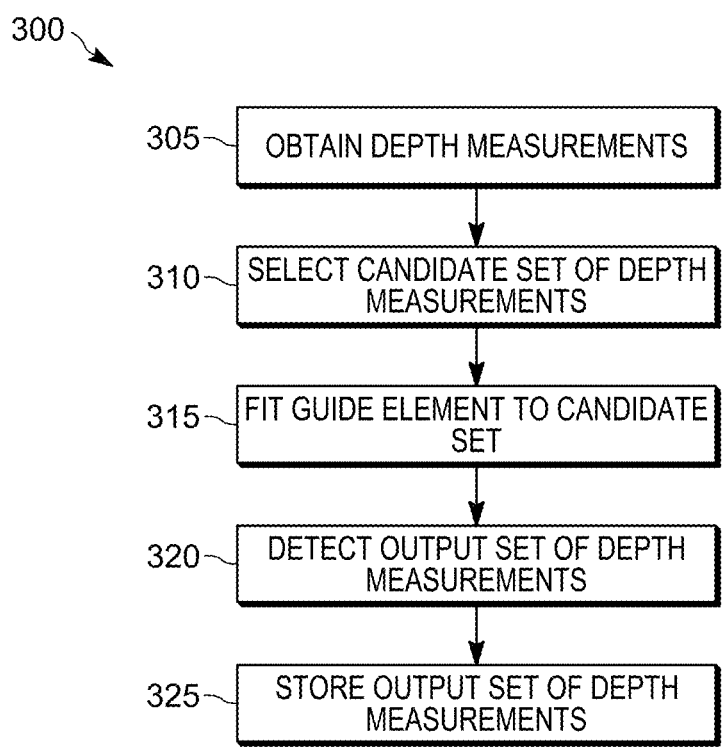
FIG. 3 is a flowchart of a method of support surface edge detection.

The functionality of the control application 128 will now be described in greater detail. Turning to FIG. 3, a method 300 of detecting an edge of a support surface is shown. The method 300 will be described in conjunction with its performance on the system 100 and with reference to the components illustrated in FIG. 2C. In other words, in the discussion below, the support surface is a support surface 117 as shown in FIG. 1, and the edge to be detected is therefore a shelf edge 118 as shown in FIG. 1. In other examples, other support surfaces and their edges may also be detected via performance of the method 300. As noted earlier, additionally, in other examples, some or all of the method 300 is performed by the components illustrated in FIG. 2B.

At block 305, the controller 120, and in particular the preprocessor 200, is configured to obtain a plurality of depth measurements captured by a depth sensor and corresponding to an area containing the above-mentioned support surface. In other words, in the present example the depth measurements correspond to an area containing at least one shelf support surface 117 and shelf edge 118. The depth measurements obtained at block 305 are, for example, captured by the apparatus 103 and stored in the repository 132. The preprocessor 200 is therefore configured, in the above example, to obtain the depth measurements by retrieving the measurements from the repository 132.

The depth measurements can take a variety of forms, according to the depth sensor employed (e.g. by the apparatus 103) to capture the measurements. For example, the apparatus 103 can include a lidar sensor, and the depth measurements therefore include one or more lidar scans captured as the apparatus 103 travels the length of an aisle (i.e., a set of adjacent shelf modules 110). The lidar sensor of the apparatus 103 captures depth measurements by sweeping a line of laser light across the shelves 110 through a predetermined set of sweep angles and determining, for each of a the sweep angles, a group of depth measurements along the line.

FIG. 4 illustrates a simplified capture of depth measurements by the apparatus 103 employing a lidar sensor. In particular, as the apparatus 103 travels along the shelves 110 (the shelf 110-3 is shown in FIG. 4 for illustrative purposes), in a direction of travel 400 substantially parallel to the shelf 110, a lidar sensor 404 of the apparatus 103 sweeps a line (e.g. of laser light) 408 through a range of angles, for example in the direction 412. In the example of FIG. 4, the line 408 is illustrated as being substantially vertical. In other examples, the line 408 may be inclined relative to vertical. For each angle, a group of depth measurements are determined along the line 408 by the sensor 404. When the line has swept through the full range of angles, the apparatus 103 may be configured to initiate a further sweep upon detection that the apparatus 103 has traveled a predetermined distance along the shelf 110.

Thus, in the example illustrated in FIG. 4, four lidar scans 416-1, 416-2, 416-3 and 416-4 are captured by the apparatus 103, each containing groups of depth measurements for each of the set of sweep angles. As shown in connection with the scan 416-1, the plurality of depth measurements include a group (shown as columns) for each of a set of sweep angles. Each group contains a number of depth measurements (each in a distinct row of the array shown in FIG. 4), corresponding to different points along the length of the line 408. The depth measurements need not be generated in the tabular format shown in FIG. 4. For example, the sensor 404 can also generate the measurements in polar coordinates.

In other examples, the apparatus 103 captures the depth measurements with the use of a depth camera, such as a stereoscopic camera including a structured light projector (e.g. which projects a pattern of infrared light onto the shelves 110). In such examples, referring to FIG. 5, the apparatus 103 proceeds along the shelves 110 in a direction of travel 500 and employs a depth camera 504 with a field of view 508 to capture a sequence of images 516-1, 516-2, 516-3, 516-4 of the shelf 110. The images each include an array of pixels, with each pixel containing a depth measurement (e.g., a value in meters or another suitable unit). The pixels can also contain intensity values (e.g. a value from 0 to 255) which map to depth values, rather than the depth values themselves. An example pixel array is shown for the image 516-1 in FIG. 5, in which darker pixels are further from the sensor 504 and the lighter pixels are closer to the sensor 504.

Returning to FIG. 3, at block 305 the preprocessor 200 can also be configured to perform one or more filtering operations on the depth measurements. For example, depth measurements greater than a predefined threshold may be discarded from the data captured at block 305. Such measurements may be indicative of surfaces beyond the shelf backs 116 (e.g. a ceiling, or a wall behind a shelf back 116). The predefined threshold may be selected, for example, as the sum of the known depth of a shelf 110 and the known width of an aisle. In other examples, measurements may be discarded from data captured with a lidar sensor corresponding to sweep angles beyond a predefined threshold. The predefined angular threshold is selected based on any one or more of the height at which the sensor 404 is mounted on the apparatus 103, the height of the shelf module 110, and the closest distance from the shelf module 110 at which the apparatus 103 is capable of traversing the shelf module 110. For example, in an implementation in which the sensor 404 is mounted on the apparatus 103 at a height of about 1 m, and in which the apparatus 103 can traverse the shelf 110 at a minimum distance of about 0.55 m, the predefined angular threshold may be set at about +/−60 degrees.

The control application 128 is then configured to proceed to block 310. At block 310, the control application 128, and more specifically the selector 204, is configured to select a candidate set of the depth measurements obtained at block 305. The candidate set of depth measurements is selected based on at least one of an expected proximity of the shelf edge 118 to the depth sensor, and an expected orientation of the shelf edge 118 relative to the depth sensor. As will be discussed in greater detail below, the apparatus 103 is assumed by the selector 204 to travel in a direction substantially parallel to the shelf edge 118. As a result, the distance between the sensor (e.g. lidar sensor 404 or depth camera 504) is expected to remain substantially constant throughout the captured data. Further, because the support surfaces 117 extend from the shelf backs 116 toward the aisle in which the apparatus 103 travels, the shelf edges 118 are expected to be closer to the apparatus 103 than other structures (e.g. products 112) depicted in the captured data. Still further, each shelf edge 118 is assumed to have a known orientation. For example, each shelf edge 118 may be expected to be a substantially vertical surface. As will be seen below, when the data captured at block 305 captured with the lidar sensor 404, the candidate set of measurements is selected based on an expected proximity to the depth sensor, and when the data captured at block 305 is captured with the depth camera 504, the candidate set of measurements is selected based on an expected orientation to the depth sensor.

Figure 6A:
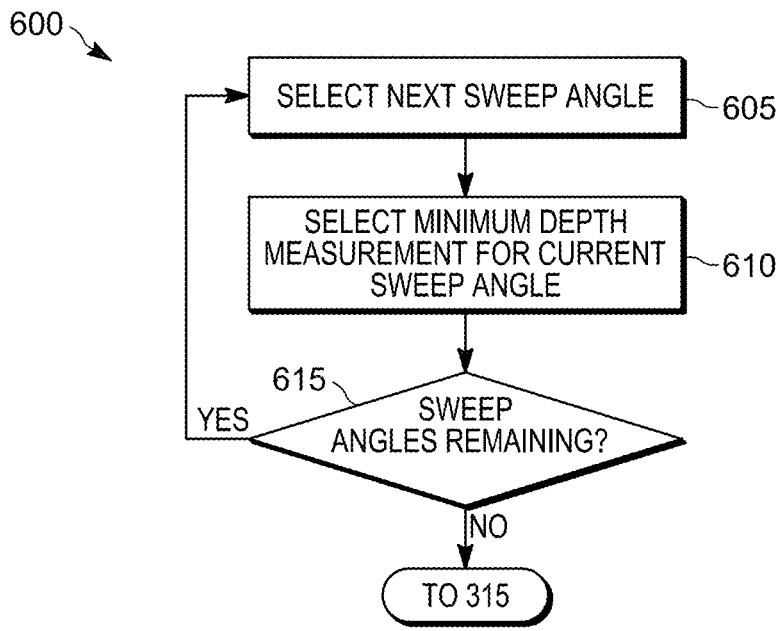
FIGS. 6A-6B depict embodiments of methods for performing block 310 of the method of FIG. 3.

Turning to FIG. 6A, a method 600 of selecting a candidate set of depth measurements (i.e., of performing block 310 of the method 300) is illustrated. In particular, the selector 204 is configured to perform the method 600 when the depth measurements obtained at block 305 are captured using a lidar sensor.

At block 605, the selector 204 is configured to select a sweep angle. As seen in FIG. 4 in connection with the scan 416-1, the depth measurements include respective groups of measurements for each of a plurality of sweep angles. In the example of FIG. 4, the sweep angles cover a range of about 120 degrees; in other examples, other ranges of sweep angles may be implemented. For a first instance of block 605, the selector 204 is configured to select a first sweep angle (e.g., the angle −60 degrees shown in FIG. 4).

At block 610, for the selected sweep angle, the selector 204 is configured to select the minimum depth measurement corresponding to that sweep angle. Thus, referring again to the scan 416-1, the selector 204 is configured to select the minimum depth measurement among the values $d_{-60-1}$, $d_{-60-2}$, $d_{-60-3}$, $d_{-60-19}$, and $d_{-60-20}$. In the present example, when the depth measurements obtained at block 305 include a plurality of lidar scans (e.g., the scans 416-1 through 416-4 shown in FIG. 4), the selection of a minimum depth measurement at block 610 is made among all available depth measurements for the current sweep angle. That is, the scans 416-2, 416-3 and 416-4 also include groups of depth measurements for the angle −60 degrees, and at block 610 the selector 204 is configured to select a single minimum depth measurement from among the groups of measurements corresponding to −60 degrees from all four scans 416. In other examples, the selector 204 is configured to repeat the selection of minimum depth measurements separately for each scan 416, thus generating a one-dimensional array for each scan. In further examples, the selector 204 is configured to combine the above approaches, generating a one-dimensional array for each scan 416, and also generating a single aggregated array across all scans 416. As will be seen below, the generation of a guide element at block 315 may be performed with respect to the single aggregated array, while the detection of output depth measurements at block 320 may be performed with respect to the individual scan-specific arrays.

In some examples, rather than selecting the minimum depth at block 610, the selector 204 is configured to select a representative sample for each sweep angle other than the minimum depth measurement. For example, the selector 204 can be configured to select the median of the depth measurements for each sweep angle. Such an approach may be employed by the selector 204 in some embodiments when the depth measurements captured by the apparatus 103 contain a level of noise above a predefined threshold.

Figure 7A:
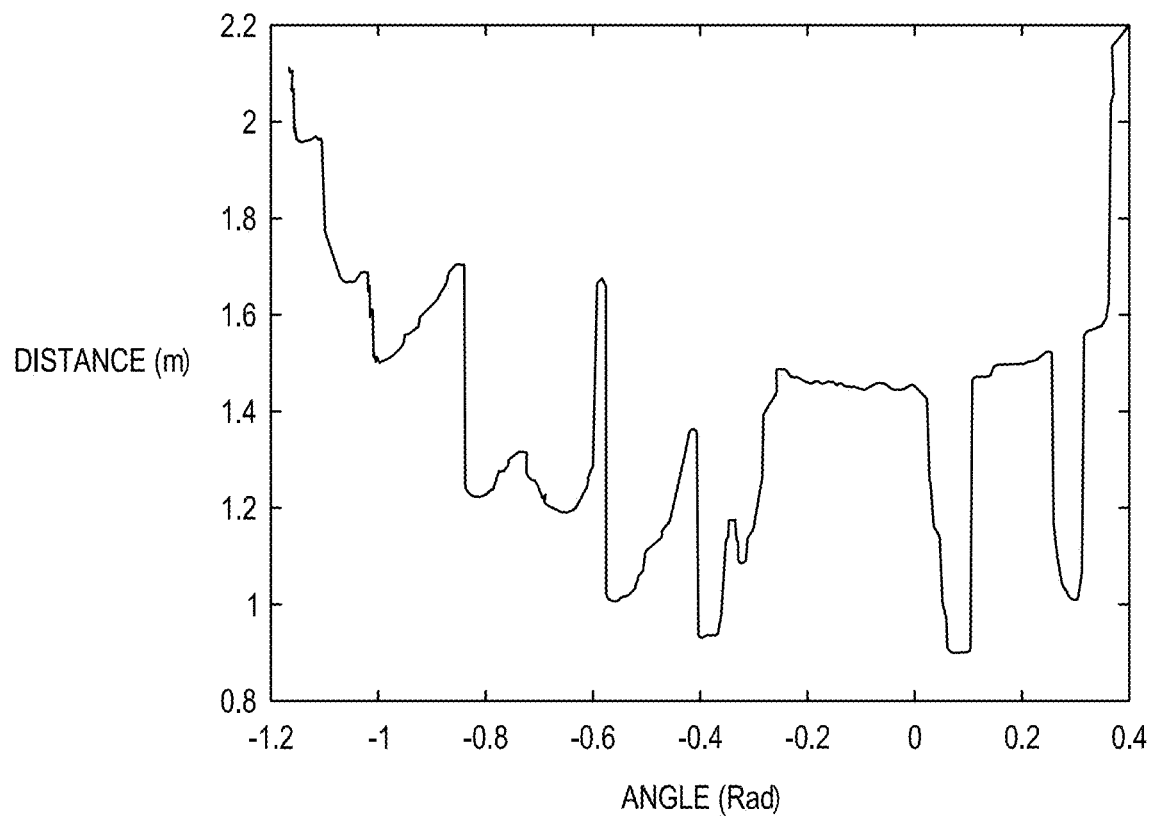
FIGS. 7A-7B depict results of the performance of the methods of FIGS. 6A-6B, respectively.

Having selected the minimum depth measurement for the current sweep angle at block 610, the selector is configured to add the selected depth measurement to the candidate set, along with an indication of the sweep angle corresponding to the minimum depth measurement (i.e., the angle selected at block 605). At block 615, the selector 204 is then configured to determine whether any sweep angles remain to be processed. When the determination is affirmative, the performance of the method 600 returns to block 605, and block 610 is repeated for the next sweep angle (e.g., −55 degrees as shown in FIG. 4). When all sweep angles have been processed, the determination at block 615 is negative, and the selector 204 passes the selected candidate set of depth measurements to the guide generator 208 for the performance of block 315 of the method 300. The candidate set of depth measurements includes, for each sweep angle, a single depth measurement, and may therefore be represented by a one-dimensional array similar in structure to a single row of the scan 416-1 shown in FIG. 4. FIG. 7A illustrates an example candidate set of depth measurements obtained through the performance of the method 600, plotted as a single line (i.e. a one-dimensional dataset), specifying the selected minimum distance for each sweep angle.

Figure 6B:
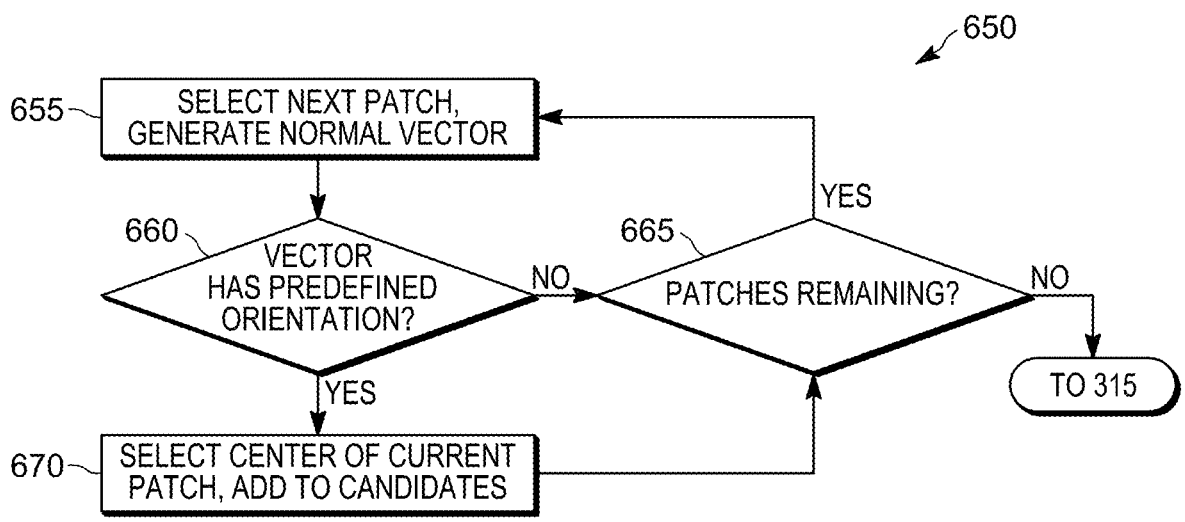

FIG. 6B illustrates an implementation of block 310 in another embodiment, in which the depth measurements obtained at block 305 are captured using a depth camera. In this embodiment, the selector 204 is configured to implement block 310 of the method 300 by performing a method 650 to select the candidate set of depth measurements.

At block 655, the selector 204 is configured to subdivide the image containing depth measurements into a plurality of overlapping patches. For example, each patch may have dimensions of 3×3 pixels, and overlap adjacent patches by 2 pixels in the vertical and horizontal directions. That is, the patches are selected such that every pixel in the depth image is the center of one patch. In other examples, larger patch dimensions may also be employed (e.g. 5×5 pixels), with a greater degree of overlap to provide one patch centered on each pixel. In further examples, the overlap between patches may be reduced to reduce the computational burden imposed by the performance of the method 650, at the expense of reduced resolution of the candidate set, as will be evident below.

At block 655, having selected a patch (e.g. the upper-left patch of 3×3 pixels of the image 516-1 shown in FIG. 1), the selector 204 is configured to generate a normal vector for the selected patch. The normal vector is a vector that extends from the central pixel of the patch, and is perpendicular to a plane defined by the depth measurements in the patch. Therefore, the selector 204 is configured to apply a suitable plane-fitting operation to the depth measurements contained in the selected patch to generate the normal vector. An example of a suitable plane-fitting operations include generating the plane from three non-collinear points. Other examples include orthogonal regression using total least squares, RANdom SAmple Consensus (RANSAC), and Least Median of Squares (LMedS).

Figure 5:
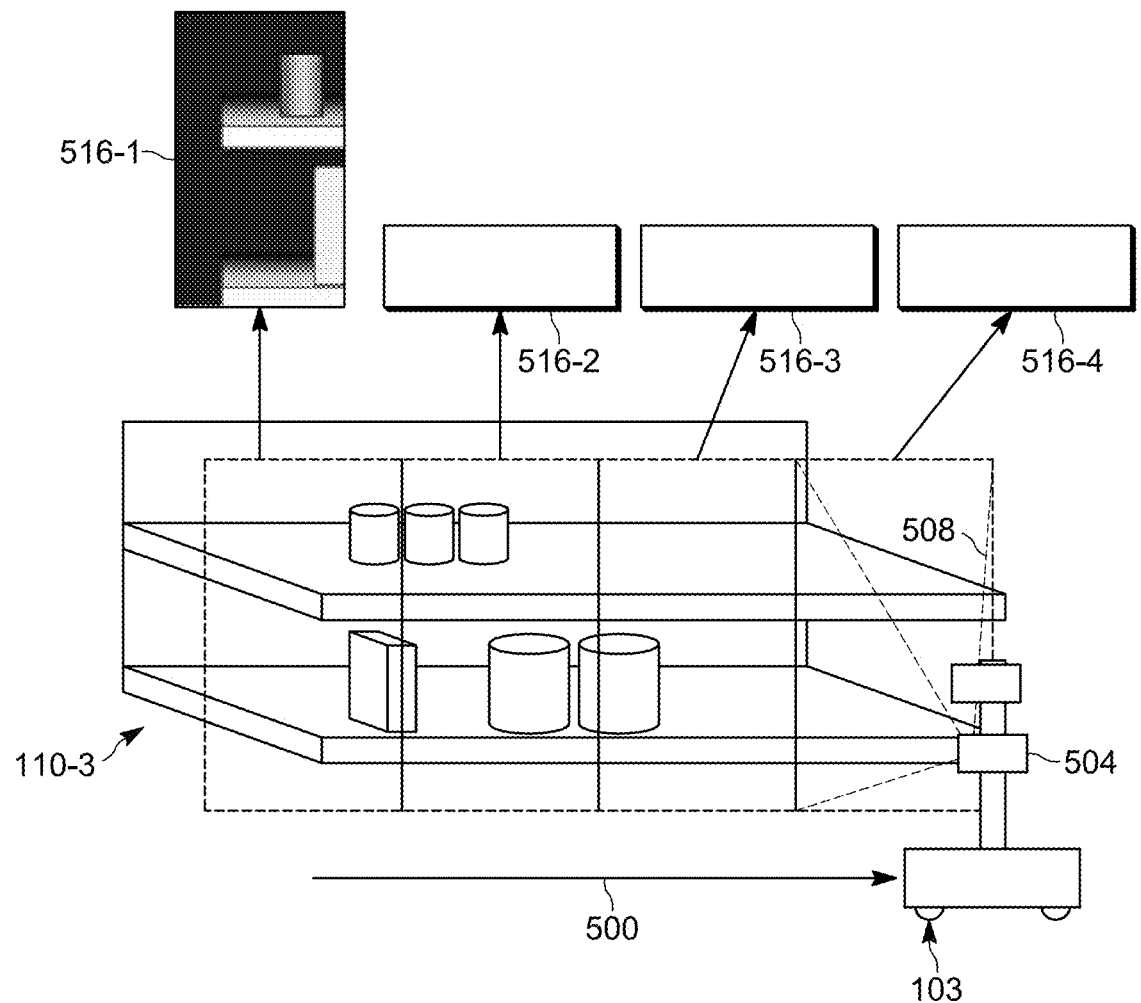
FIG. 5 depicts the capture of data employed in the method of FIG. 3 according to a second sensing technology.

At block 660, the selector 204 is configured to determine whether the normal vector generated at block 655 has a predefined orientation. As noted earlier, when the data captured at block 305 is captured with the depth camera 504, the candidate set of measurements is selected based on an expected orientation to the depth sensor. The expected orientation of the shelf edge 118 relative to the depth sensor (e.g. the camera 504), as shown in FIG. 5, is facing towards the depth sensor. In other words, referring to FIG. 7B which illustrates a portion 700 of the image 516-1, the patches of the captured image depicting shelf edges 118 are expected to exhibit normal vectors oriented substantially in the depth or Z direction, with minimal contribution from the X or Y directions.

Figure 7B:
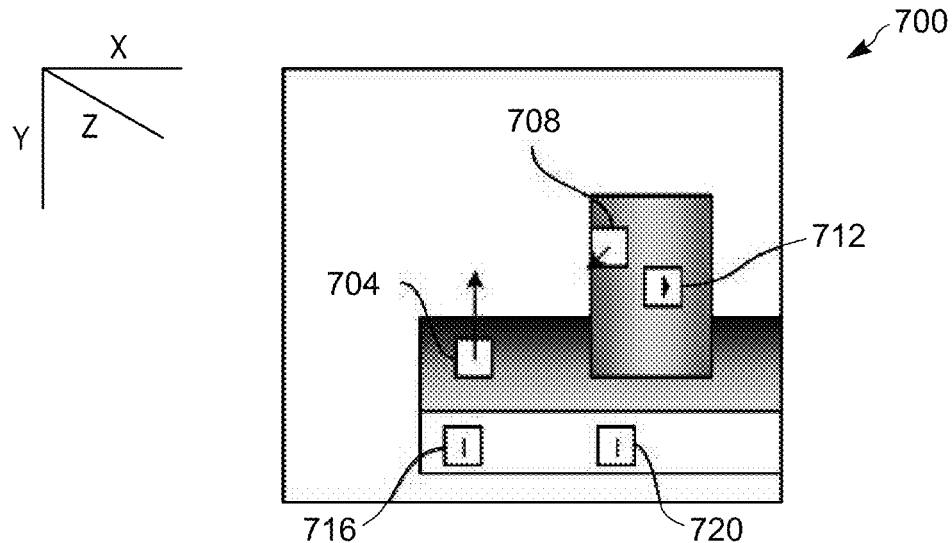

The selector 204 is therefore configured to perform the determination at block 660 by comparing the normal vector generated at block 655 to the predefined expected orientation. Referring again to FIG. 7B, a number of example patches 704, 708, 712 716 and 720 are shown, with depictions of their normal vectors. In the present example, the expected orientation is parallel to the Z axis in the image frame of reference (i.e. directly perpendicular to the page of FIG. 7B), The determination at block 660 can include, for example, determining the components of the normal vector in each of the X, Y and Z directions and determining whether the magnitude of the Z direction is greater than the X and Y directions by a predetermined factor. In another example, the determination at block 660 includes determining whether the X and Y magnitudes of the normal vector are below predetermined thresholds. As seen in FIG. 7B, the normal vectors of the patches 704 and 708 deviate significantly from the Z direction, while normal vector of the patch 712 is substantially parallel to the Z axis and the normal vectors of the patches 717 and 720 are parallel to the Z axis.

Returning to FIG. 6B, when the determination is negative at block 660 (as in the case of the patch 704, for example) the selector 204 proceeds directly to block 655. When the determination at block 660 is affirmative, however, the selector 204 is configured to select the center pixel of the current patch, and add the selected pixel to the set of candidate depth measurements. The selector 204 is then configured to proceed to block 665, to determine whether further patches remain to be processed. When the determination at block 665 is affirmative, the selector 204 repeats blocks 655-670 until the determination at block 665 is negative, at which point the selector 204 passes the set of candidate depth measurements (e.g., indicated by pixel positions in the image frame of reference) to the guide generator 208 for use at block 315 of the method 300.

Figure 8A:
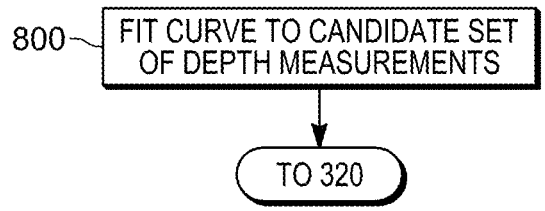
FIGS. 8A-8B depict embodiments of methods for performing block 315 of the method of FIG. 3.
Figure 9A:
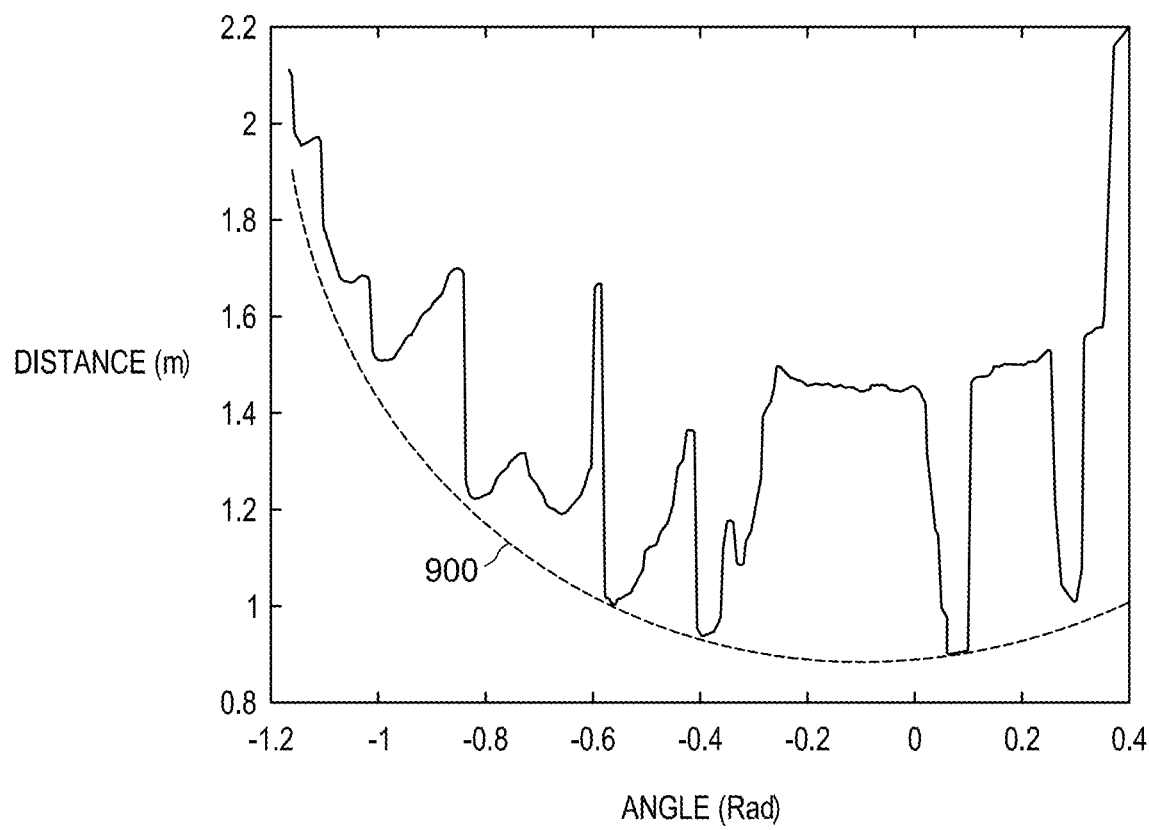
FIGS. 9A-9B depict results of the performance of the method of FIG. 8A.
Figure 9B:
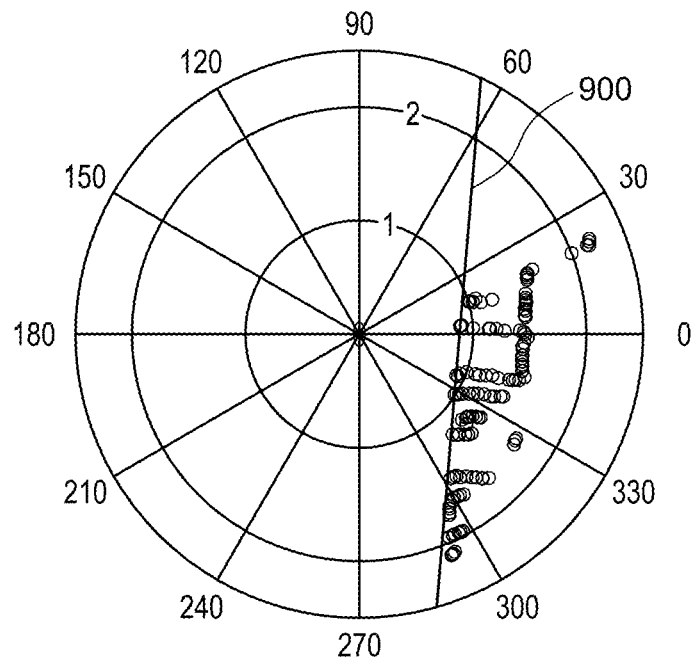

Returning to FIG. 3, at block 315 the guide generator 208 is configured to fit a guide element to the candidate set of depth measurements. The nature of the guide element is dependent on the type of depth measurements obtained at block 305. The guide element is generated as a set of parameters defining the element, such as the equation of a curve, plane or the like, expressed in the frame of reference of the captured data (i.e., the lidar data or depth image). For example, a planar guide element may be expressed as a normal vector perpendicular to the plane, and a distance parameter defining the length of the normal from the plane to the origin of the above frame of reference. As a further example, a linear guide element may be expressed as a vector defining the orientation of the line in the above frame of reference. When the depth measurements obtained at block 305 are lidar measurements, block 305 is implemented according to block 800 shown in FIG. 8A. Specifically, the guide generator 208 is configured to fit a curve to the candidate set of depth measurements (e.g. those selected via the performance of the method 600 discussed above). The guide generator 208 is configured to generate the above-mentioned curve to minimize a depth of the curve (i.e. to place the curve as close as possible to the origin in the lidar frame of reference), and to maximize the number of the candidate depth measurements that are intersected by the curve (i.e., to maximize the population of inliers of the curve). Turning to FIG. 9A, the candidate set of depth measurements from FIG. 7A is illustrated, along with a curve 900 fitted to the candidate set according to block 800. FIG. 9B illustrates the same candidate set and the curve 900 in polar coordinates, in which the curve 900 appears as a straight line. Having generated the guide element at block 800, the guide generator 208 is configured to pass the guide element (e.g. as an equation defining the curve 900 in the lidar frame of reference), as well as the candidate set of depth measurements, to the output detector 212 for use at block 320 of the method 300.

Figure 8B:
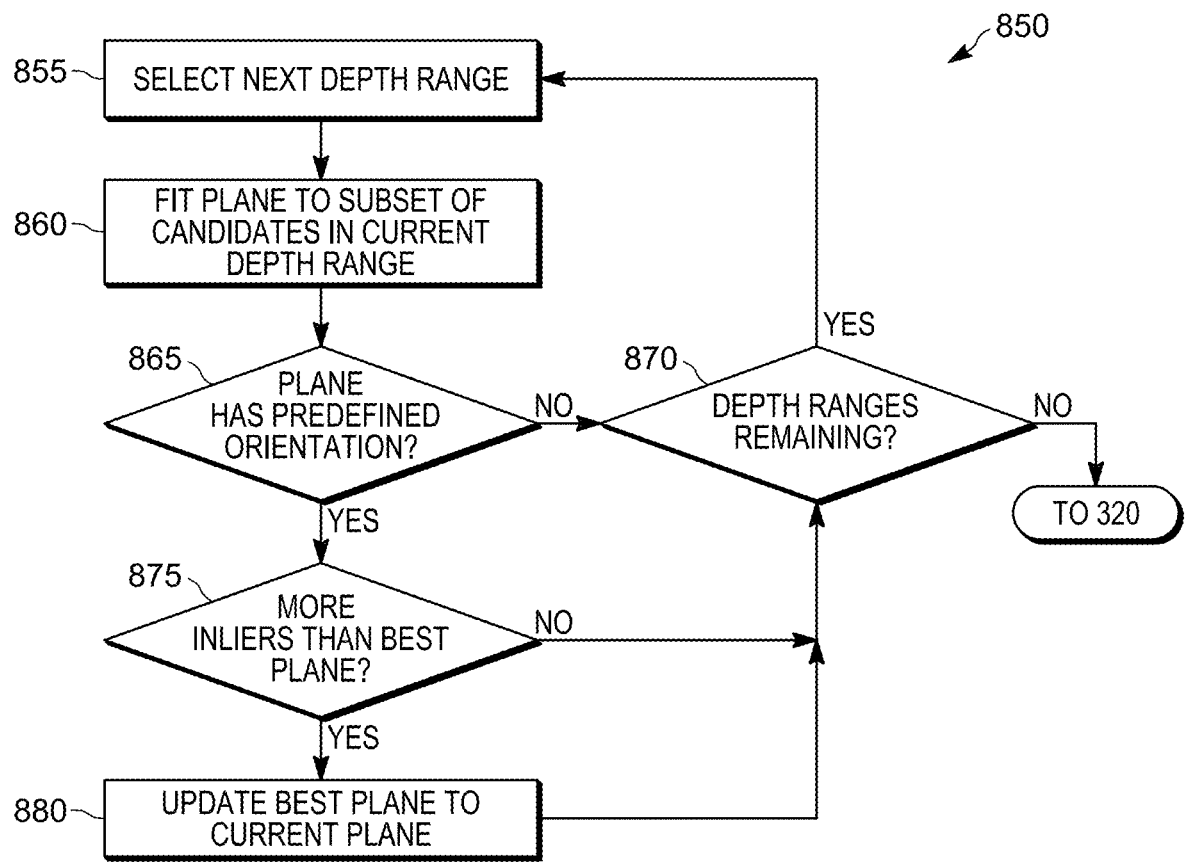

Referring to FIG. 8B, when the depth measurements obtained at block 305 are captured with a depth camera, the guide generator 208 is configured to implement block 315 via the performance of a method 850. In particular, the guide generator 208 is configured to assess each of a plurality of depth ranges (which may also be referred to as search volumes), as described below.

At block 855, the guide generator 208 is configured to select a depth range. In the present example, the guide generator 208 is configured to assess depth ranges in a sequence beginning with a minimum depth (e.g. a depth of zero, indicating a search volume immediately adjacent to the depth sensor at the time of data capture), with each and increasing by predefined distances. Thus, for example, the depth ranges assessed may include a depth range of 0 to 0.2 m, 0.2 m to 0.4 m, 0.4 m to 0.6 m, and so on, until a predefined maximum depth (e.g., 2.0 m). Each depth range may contain a subset of the candidate set of pixels selected through the performance of the method 650. The guide generator 208 may also be configured to determine whether the selected depth range contains any candidate pixels, and when it does not, to immediately advance to the next depth range.

Figure 10A:
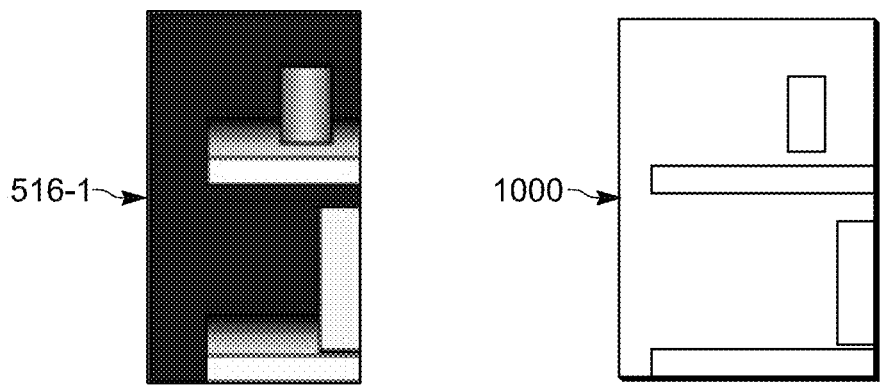
FIGS. 10A-10C depict results of the performance of the method of FIG. 8B.
Figure 10B:
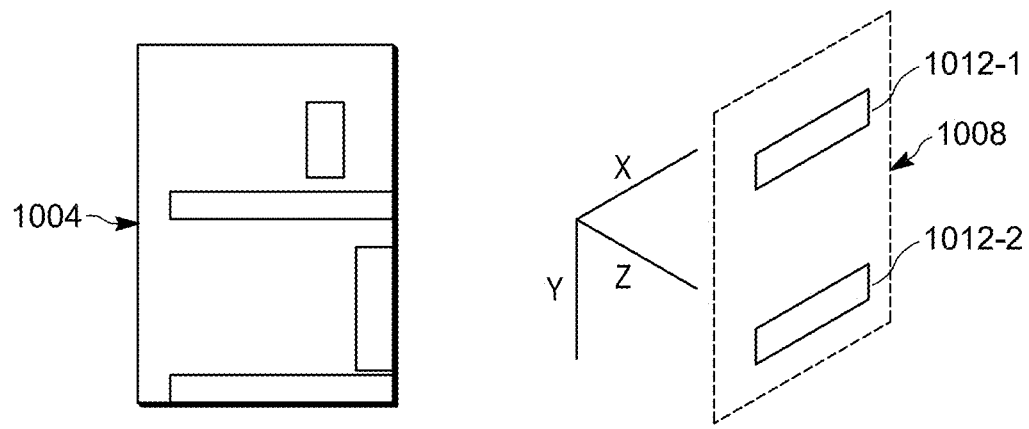

At block 860, the guide generator 208 is configured to fit a plane to the subset of candidate pixels contained within the current depth range. The subset includes any of the candidate pixels having depth measurements (e.g., along the Z axis) within the depth range, regardless of the position of such pixels in the image (e.g., the position on the X and Y axes). Turning to FIG. 10A, the original depth image 516-1 is illustrated, along with the candidate set of pixels 1000. As discussed above, the candidate set of pixels 1000 are those having normal vectors oriented substantially in the Z direction. FIG. 10B illustrates a subset 1004 of the candidate pixels 1000 that fall within a first depth range selected at block 855. As seen by comparing FIGS. 10A and 10B, the pixels corresponding to the cylindrical product 112 supported on the upper support surface 117 (e.g., see FIGS. 1 and 5) are not contained in the first depth range, as their depths are greater than the furthest extent of the first depth range.

The guide generator 208 is configured to fit a plane 1008 to the subset 1004 according to a suitable plane fitting operation. For example, a plane fitting operation may be selected for the performance of block 860 that maximizes the number of points in the subset 1004 that are intersected by the plane (i.e., that are inliers of the plane). As seen in FIG. 10B, the plane 1008 contains certain pixels in regions 1012-1 and 1012-2 from the subset 1004 while omitting others. Specifically, the pixels contained within the plane 1008 include those depicting the shelf edges 118, but omit the remainder of the subset 1004, which are at greater depths than the pixels in the regions 1012.

Returning to FIG. 8B, at block 865 the guide generator 208 is configured to determine whether the plane generated at block 860 has a predefined orientation. The predefined orientation reflects the expected orientation of the shelf edges 118 relative to the depth camera, as discussed above. Therefore, in the present example, the predefined orientation is perpendicular to the Z axis (i.e., parallel to the XY plane in the image frame of reference). At block 865, therefore, the guide generator 208 is configured to determine an error metric between the orientation of the plane 1008 and the predefined orientation. The plane orientation and the predefined orientation may be represented by the guide generator as normal vectors to each of the planes, which may be compared as discussed earlier in connection with block 660.

When the determination at block 865 is negative, the plane generated at block 860 is discarded, and the guide generator 208 determines at block 870 whether any depth ranges remain to be assessed. When the determination at block 865 is affirmative, however, as in the case of the plane 1008 shown in FIG. 10B, the guide generator 208 is configured to proceed to block 875. At block 875, the guide generator 208 is configured to determine whether the population of the candidate set of depth measurements that are inliers of the plane generated at block 860 is greater than the currently stored best plane. In the present example performance of the method 850, no best plane has been stored, and the determination is therefore affirmative at block 875. The guide generator 208 is therefore configured to proceed to block 880 and to update a best plane indicator in the memory 122 to correspond to the plane generated at block 860. The plane indicator stored in the memory 122 includes any suitable set of parameters defining the plane (e.g., a normal vector and a depth).

Figure 10C:
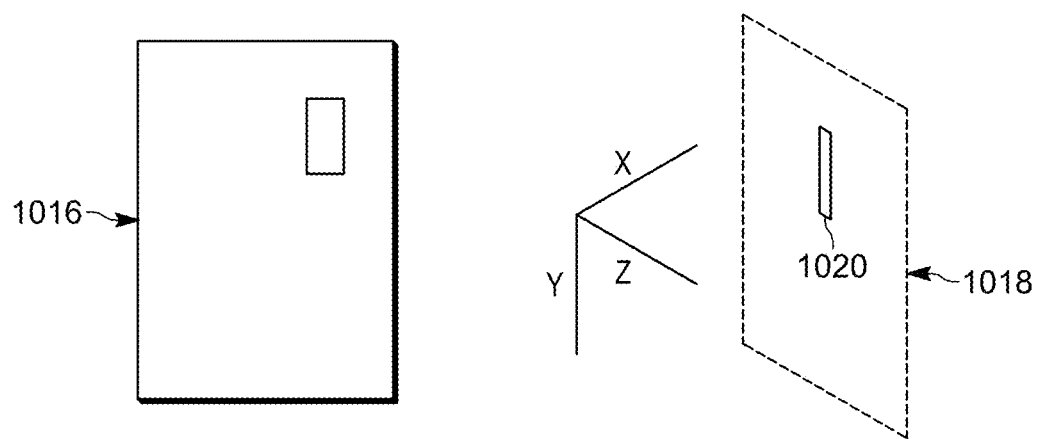

The guide generator 208 is then configured to determine, at block 870, whether any depth ranges remain to be assessed. In the present example performance, a second depth range remains to be assessed, as shown in FIG. 10C by way of a second subset 1016 of the candidate set of depth measurements 1000. The guide generator 208 is configured to select the next depth range at block 855, to fit a further plane (shown as a plane 1018 in FIG. 10C) to the subset of candidate depth measurements within the depth range at block 860, and to determine whether the plane 1018 has the predefined orientation at block 865. In the example shown in FIG. 10C, the plane 1018 does not have the predefined orientation, and the guide generator 208 is therefore configured to discard the plane 1018 and proceed to block 870. As will also be apparent from FIG. 10C, even if the plane 1018 matched the predefined orientation, the number of candidate depth measurements intersected by the plane 1018, indicated at 1020, is lower than the number candidate depth measurements intersected by the plane 1008. The determination at block 875 would therefore also have been negative, resulting in the plane 1018 being discarded.

When all depth ranges have been assessed, a negative determination at block 870 leads the guide generator 208 to pass the current best plane (e.g. as a normal vector and a depth) to the output detector 212 for further processing at block 320 of the method 300.

Figures 11A, 11B:
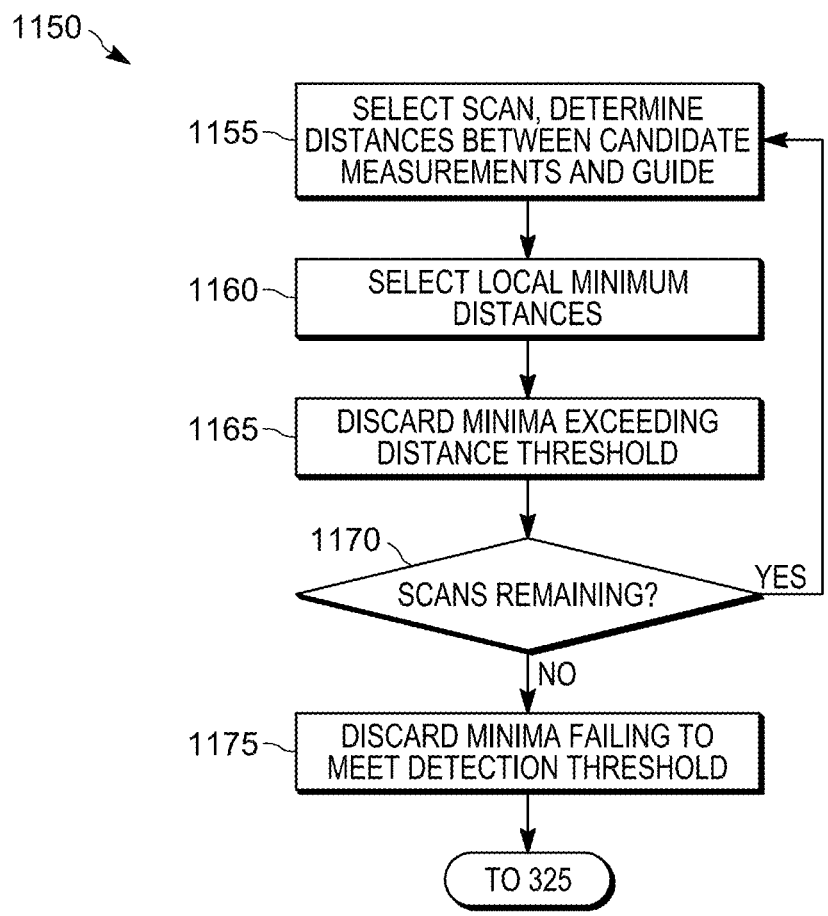
FIGS. 11A-11B depict embodiments of methods for performing block 320 of the method of FIG. 3.

Returning to FIG. 3, at block 320 the output detector 212 is configured to detect an output set of the depth measurements that are likely to correspond to the shelf edge 118 from the candidate set of depth measurements. In other words, the output set of depth measurements detected at block 320 identifies the locations of the shelf edges 118 in the captured data. The output set of depth measurements are detected according to a proximity between each candidate depth measurement and the guide element generated at block 315. Referring to FIG. 11A, when the depth measurements are captured via the depth camera 504, the detection of the output set of depth measurements is performed by the output detector 212 at block 1100 by selecting the inliers of the best plane determined via the method 850. That is, recalling that the plane 1008 in FIG. 10B was selected as the best plane in the present example, the detection of the output set of depth measurements (i.e., the detection of the shelf edges 118) is performed by the output detector 212 selecting the pixels falling within the regions 1012-1 and 1012-2. The output detector 212 is then configured to proceed to block 325, as will be discussed further below.

Figure 12A:
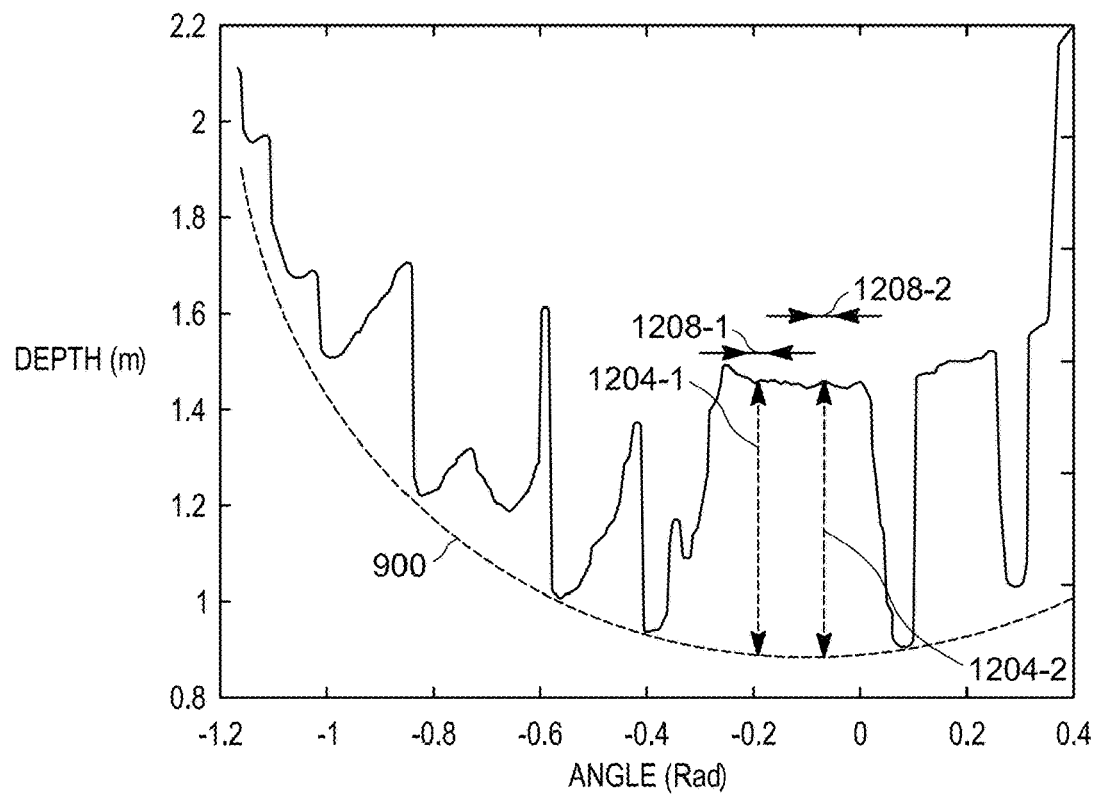
FIGS. 12A-12B depict results of the performance of the method of FIG. 8B.
Figure 12B:
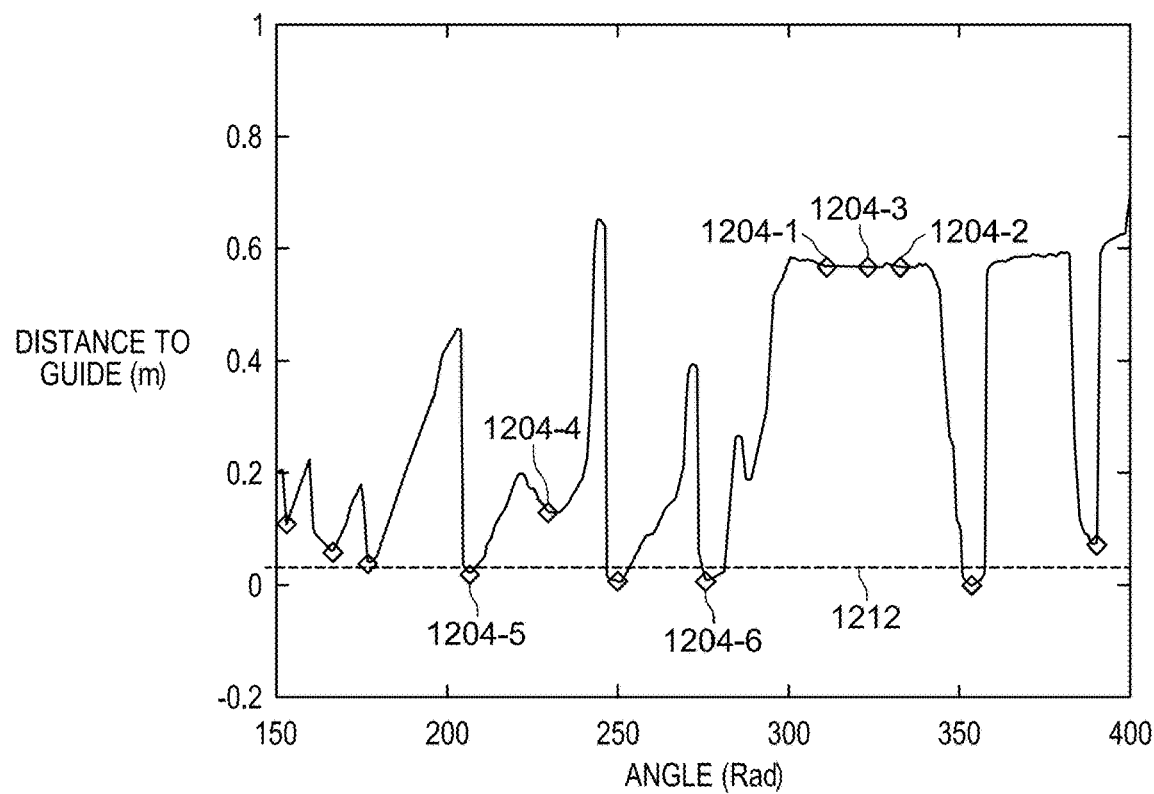

Turning to FIG. 12B, when the depth measurements are captured via the lidar sensor 404, the output detector 212 is configured to perform block 320, in some examples, via the performance of a method 1150. At block 1155, the output detector 212 is configured to select one of the scans processed in blocks 305-315, where multiple scans are available. For example, the output detector 212 may be configured to select the scan 416-1. Having selected a scan, the output detector 212 is configured to determine a distance between the guide element (e.g., the curve 900) and the previously selected minimum depths for the scan. In other words, the curve 900 (which is generated based on the set of scans 416 at block 315) is compared with the minimum depths per sweep angle for each individual scan 416.

At block 1160, the output detector 212 is configured to select local minima among the distances determined at block 1155. The local minima may be selected from a preconfigured range of sweep angles (e.g. one minimum distance may be selected among five consecutive distances). Turning to FIG. 12A, a set of minimum depths per sweep angle is shown, as selected from a scan 416 (e.g. the scan 416-1). Example local minimum distances 1204-1 and 1204-2 are also illustrated between the curve 900 and ranges 1208-1 and 1208-2, respectively, of the minimum depth measurements. FIG. 12B illustrates the distances between each of the minimum depth measurements and the curve 900 (which itself is not shown in FIG. 12B), with the local minima 1204-1 and 1204-2 mentioned above shown, along with further local minima 1204-3, 1204-4, 1204-5 and 1204-6. As will be apparent, additional local minima are also identified, but are not labelled in FIG. 12B for simplicity of illustration.

Returning to FIG. 11B, at block 1165 the output detector 212 is configured to discard the selected minimum distances that exceed a preconfigured distance threshold. The threshold is preconfigured as a distance beyond which the likelihood of detected local minima depicting a shelf edge 118 is low. For example, the threshold may be preconfigured between zero and about ten centimeters. In other examples, the threshold may be preconfigured as between zero and about five centimeters. In further examples, as shown in FIG. 12B, the threshold is preconfigured at about two centimeters, as illustrated by the line 1212. At block 1165, therefore, the output detector 212 is configured to discard the local minima 1204-1 through 1204-4, and to select the local minima 1204-5 and 1204-6.

At block 1170, the output detector 212 is configured to determine whether any scans remain to be processed. When scans remain to be processed, the performance of blocks 1155-1165 is repeated for each remaining scan. When the determination at block 1170 is negative, the output detector 212 proceeds to block 1175. At block 1175, the output detector is configured to discard any local minimum distances that fail to meet a detection threshold. The detection threshold is a preconfigured number of scans in which a local minimum must be detected at the same sweep angle in order to be retained in the output set of depth measurements. For example, if the detection threshold is three, and local minima are selected for the sweep angle of −55 degrees for only two scans (i.e., the remaining scans do not exhibit local minima at −55 degrees), those local minima are discarded. Discarding local minima that do not meet the detection threshold may prevent the selection of depth measurements for the output set that correspond to measurement artifacts or structural anomalies in the shelf edges 118. In other examples, the performance of block 1175 may be omitted.

Following the performance of block 1175, or following the negative determination at block 1170 if block 1175 is omitted, the output detector 212 is configured to proceed to block 325.

At block 325, the output detector 212 is configured to store the output set of depth measurements. The output set of depth measurements are stored, for example in the repository in association with the captured data (e.g. the captured lidar scans 416 or depth images 516), and include at least identifications of the output set of depth measurements. Thus, for lidar data, the output set is stored as a set of sweep angle and line index coordinates corresponding to the local minima selected at block 1160 and retained through blocks 1165 and 1175. For depth image data, the output set is stored as pixel coordinates (e.g. X and Y coordinates) of the inlier pixels identified at block 1100. The output set, as stored in the memory 122, can be passed to further downstream functions of the server or retrieved by such functions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting an edge of a shelf by an imaging controller, the edge of the shelf facing into an aisle, the method comprising:
   obtaining a plurality of depth measurements captured by a depth sensor positioned in the aisle, the depth measurements defining distances from the depth sensor to respective points on the shelf;
   selecting, by the imaging controller, a candidate set of the depth measurements based on at least one of (i) an expected proximity of the edge of the shelf to the depth sensor, and (ii) an expected orientation of the edge of the shelf relative to the depth sensor;
   fitting, by the imaging controller, a guide element to the candidate set of depth measurements; and
   detecting, by the imaging controller, an output set of the depth measurements that lie on the edge of the shelf from the candidate set of depth measurements according to a proximity between each candidate depth measurement and the guide element.

2. The method of claim 1, wherein obtaining the depth measurements comprises obtaining a lidar scan including, for each of a plurality of sweep angles, a respective group of the depth measurements.

3. The method of claim 2, wherein selecting the candidate set further comprises, for each sweep angle, selecting a single minimum depth measurement from the group corresponding to the sweep angle.

4. The method of claim 3, wherein obtaining the depth measurements comprises obtaining a plurality of lidar scans each including, for each of the plurality of sweep angles, a respective group of the depth measurements; and wherein selecting the candidate set further comprises, for each sweep angle, selecting a single minimum depth measurement from the plurality of groups corresponding to the sweep angle.

5. The method of claim 2, wherein fitting the guide element comprises fitting a curve to the candidate set of depth measurements.

6. The method of claim 5, wherein fitting the curve to the candidate set of depth measurements comprises at least one of: minimizing a depth of the curve; and maximizing a population of the candidate depth measurements intersected by the curve.

7. The method of claim 2, wherein detecting the output set comprises:

determining, for each candidate depth measurement, a distance between the candidate depth measurement and the guide element;

identifying local minima among the distances; and selecting the candidate depth measurements corresponding to the local minima.

8. The method of claim 1, wherein obtaining the depth measurements comprises obtaining a depth image including a plurality of pixels each containing one of the depth measurements.

9. The method of claim 8, wherein selecting the candidate set of depth measurements comprises:

subdividing the depth image into a plurality of patches;

generating normal vectors for each of the patches; and selecting the depth measurements contained in patches having normal vectors with a predetermined orientation.

10. The method of claim 8, wherein fitting the guide element comprises:

at each of a predetermined sequence of depth ranges, fitting a plane to the candidate depth measurements within the depth range; and selecting one of the planes intersecting the greatest number of the candidate depth measurements.

11. The method of claim 10, wherein detecting the output set of depth measurements comprises selecting the candidate depth measurements that are intersected by the one of the planes.

12. A computing device for detecting an edge of a shelf, the edge facing into an aisle, the computing device comprising:

a memory; and an imaging controller including:

a preprocessor configured to obtain a plurality of depth measurements captured by a depth sensor positioned in the aisle, the depth measurements defining distances from the depth sensor to respective points on the shelf;

a selector configured to select a candidate set of the depth measurements based on at least one of (i) an expected proximity of the edge of the shelf to the depth sensor, and (ii) an expected orientation of the edge of the shelf relative to the depth sensor;

a guide generator configured to fit a guide element to the candidate set of depth measurements; and an output detector configured to detect an output set of the depth measurements that lie on the edge of the shelf from the candidate set of depth measurements according to a proximity between each candidate depth measurement and the guide element.

13. The computing device of claim 12, wherein the preprocessor is configured to obtain the depth measurements by obtaining a lidar scan including, for each of a plurality of sweep angles, a respective group of the depth measurements.

14. The computing device of claim 13, wherein the selector is configured to select the candidate set by, for each sweep angle, selecting a single minimum depth measurement from the group corresponding to the sweep angle.

15. The computing device of claim 14, wherein the preprocessor is further configured to obtain the depth measurements by obtaining a plurality of lidar scans each including, for each of the plurality of sweep angles, a respective group of the depth measurements; and wherein the selector is further configured to select the candidate set by, for each sweep angle, selecting a single minimum depth measurement from the plurality of groups corresponding to the sweep angle.

16. The computing device of claim 13, wherein the guide generator is configured to fit the guide element by fitting a curve to the candidate set of depth measurements.

17. The computing device of claim 16, wherein the guide generator is configured to fit the curve to the candidate set of depth measurements by at least one of:

minimizing a depth of the curve; and maximizing a population of the candidate depth measurements intersected by the curve.

18. The computing device of claim 13, wherein the output detector is configured to detect the output set by:

determining, for each candidate depth measurement, a distance between the candidate depth measurement and the guide element;

identifying local minima among the distances; and selecting the candidate depth measurements corresponding to the local minima.

19. The computing device of claim 12, wherein the preprocessor is configured to obtain the depth measurements by obtaining a depth image including a plurality of pixels each containing one of the depth measurements.

20. The computing device of claim 19, wherein the selector is configured to select the candidate set of depth measurements by:

subdividing the depth image into a plurality of patches;

generating normal vectors for each of the patches; and selecting the depth measurements contained in patches having normal vectors with a predetermined orientation.

21. The computing device of claim 19, wherein the guide generator is configured to fit the guide element by:

at each of a predetermined sequence of depth ranges, fitting a plane to the candidate depth measurements within the depth range; and selecting one of the planes intersecting the greatest number of the candidate depth measurements.

22. The computing device of claim 21, wherein the output detector is configured to detect the output set of depth measurements by selecting the candidate depth measurements that are intersected by the one of the planes.

* * * * *